E. H. DEWSON.
SAFETY CAR CONTROL DEVICE.
APPLICATION FILED JUNE 9, 1921.
1,414,073.  Patented Apr. 25, 1922.
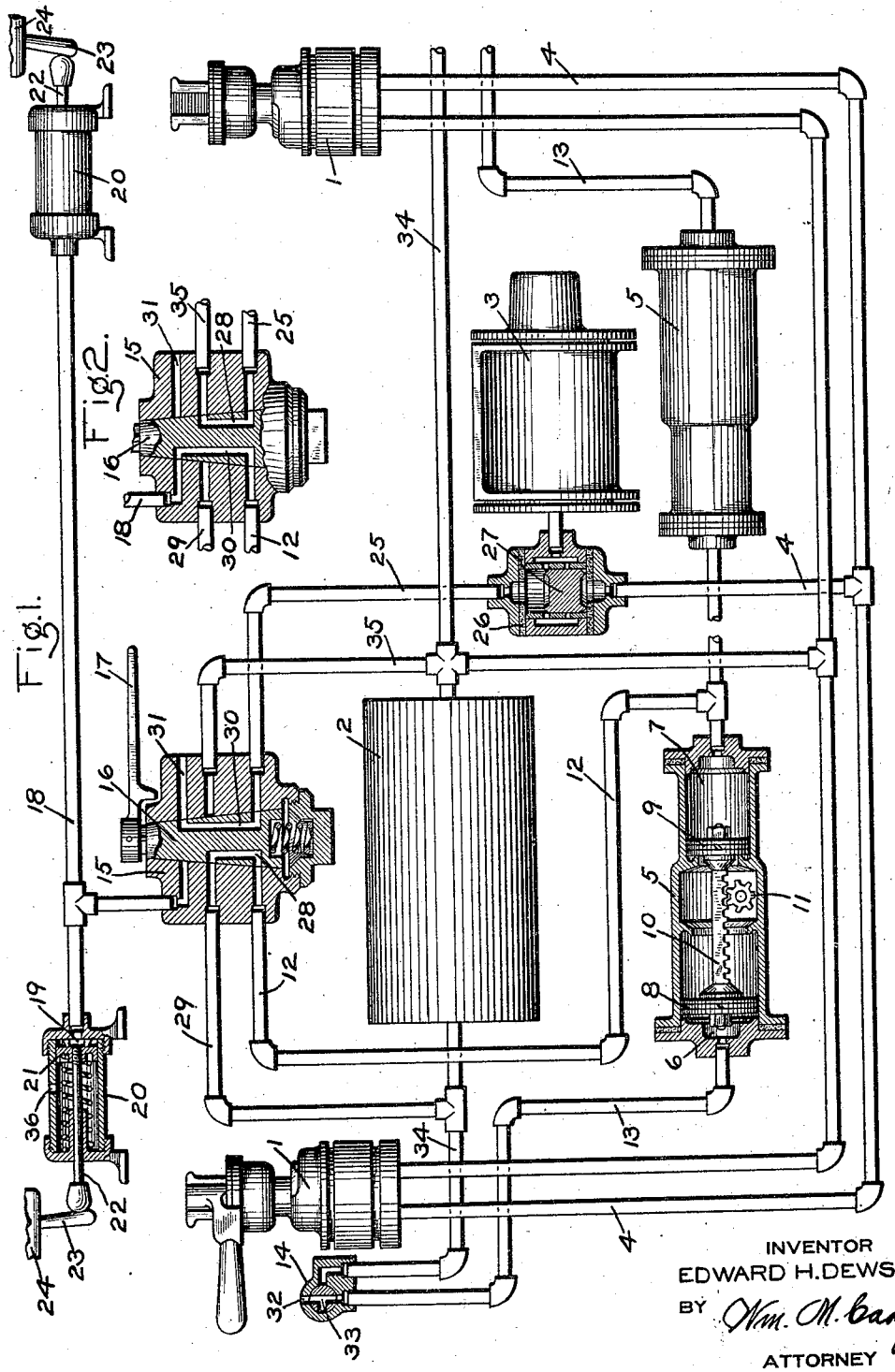
INVENTOR
EDWARD H. DEWSON
BY *Wm. M. Cady*
ATTORNEY

UNITED STATES PATENT OFFICE.

EDWARD H. DEWSON, OF NEW YORK, N. Y., ASSIGNOR TO THE WESTINGHOUSE AIR BRAKE COMPANY, OF WILMERDING, PENNSYLVANIA, A CORPORATION OF PENNSYLVANIA.

SAFETY CAR CONTROL DEVICE.

1,414,073.  Specification of Letters Patent.  Patented Apr. 25, 1922.

Application filed June 9, 1921. Serial No. 476,210.

*To all whom it may concern:*

Be it known that I, EDWARD H. DEWSON, a citizen of the United States, residing at New York, in the county of New York and State of New York, have invented new and useful Improvements in Safety Car-Control Devices, of which the following is a specification.

This invention relates to safety car control apparatus, and more particularly to an apparatus of the above character adapted for application to an existing straight air brake equipment.

The principal object of my invention is to provide a safety car control apparatus adapted to be applied to an existing straight air brake equipment and by which a passenger may apply the brakes, cut off the power, and unlock or balance the car doors.

Other objects and advantages will appear in the following more detailed description of the invention.

In the accompanying drawing; Fig. 1 is a diagrammatic view, partly in section, of a straight air brake equipment with a safety car control apparatus applied in accordance with my invention; and Fig. 2 a central sectional view of the manually operated controlling cock in the brake applying position.

As shown in the drawing, the straight air brake equipment may comprise a straight air brake valve device 1 at each end of the car, a main reservoir 2 or other source of fluid under pressure, a brake cylinder 3, and a straight air brake pipe 4.

A door engine 5 may be located at each end of the car for controlling the corresponding car door and may comprise a casing having piston chambers 6 and 7 containing differential piston heads 8 and 9.

Said piston heads are connected together by a rack bar 10, the teeth of which mesh with a pinion 11 for controlling the opening and closing of a car door.

The piston chamber 7 of the smaller piston head 9 is connected to a pipe 12 and piston chamber 6 is connected by a pipe 13 to a controlling cock 14.

In order to provide for the application of the brakes, the cutting off of power, and the unlocking or balancing of the car doors by a passenger, a manually operated valve device 15 is provided comprising a casing containing a plug cock 16 adapted to be operated by a handle 17 and connected to said valve device is a pipe 18 which leads to the piston chamber 19 of a circuit breaker cylinder 20. The cylinder 20 contains a piston 21 having a stem 22 adapted to engage the arm 23 of a circuit breaker 24.

A pipe 25 through which fluid is supplied to the brake cylinder 3 by manipulation of the cock 16 is connected to one side of a double check valve device 26, the other side of the double check valve being connected to the straight air brake pipe 4 and the double check valve 27 controls communication from the pipe 25 and the straight air pipe 4 to the brake cylinder 3.

In the normal position of the cock 16, as shown in Fig. 1, the pipe 12 is connected by a cavity 28 with a pipe 29 leading to the main reservoir 2, so that piston chamber 7 is maintained at main reservoir pressure and pipe 25 is connected by a cavity 30 with an atmospheric exhaust port 31.

With the door controlling cock in the position shown, pipe 13 is connected to an exhaust port 32, so that piston chamber 6 is at atmospheric pressure, causing the main reservoir pressure in piston chamber 7 to operate the differential piston heads so as to hold the car door in its closed position.

The car operator may apply the brakes by manipulation of the brake valve device 1, so that fluid under pressure is supplied to the straight air pipe 4 in the usual manner and this pressure acts on the double check valve 27 to shift same so that communication is opened for supplying fluid from the straight air pipe to the brake cylinder, the opposite side of the double check valve being connected to the atmosphere through the passenger's controlling cock 16.

The car door may be opened by the car operator by turning the valve 14 to a position in which cavity 33 connects a pipe 34 leading to the main reservoir with pipe 13. Since the area of the piston head 8 is greater than the area of piston head 9, the differential piston will be shifted to the right, operating the pinion 11 so as to open the car door.

If an emergency occurs, a passenger may stop the car by causing the handle 17 of the controlling cock 15 to be shifted to the position shown in Fig. 2. In this position, the pipe 25 is connected through cavity 28 in the valve 16 with a pipe 35 leading to the main reservoir 2, so that fluid under pressure is supplied from the main reservoir to pipe 25 and the double check valve 27 is operated thereby to open communication from pipe 25 to the brake cylinder 3, thus causing the brakes to be applied.

The pipe 12 is also connected, by cavity 30 with pipe 18, so that the fluid pressure in piston chamber 7 and pipe 12 is supplied to pipe 18, and the piston 21 of the circuit breaker cylinder is thereby actuated to effect the shifting of the circuit breaker handle 23 and the opening of the power circuit.

When the piston 21 moves out beyond the exhaust port 36, fluid is vented from the piston chamber 19 and also from the piston chamber 7, so that the opposite sides of the differential piston of the door engine being balanced at atmospheric pressure, the car door may be readily opened by a passenger in the car.

Having now described my invention, what I claim as new and desire to secure by Letters Patent, is:—

1. The combination with a straight air brake including a brake cylinder and a straight air pipe, of a valve device adapted to be operated by a passenger for supplying fluid to the brake cylinder and a double check valve device for controlling communication from said valve device and from the straight air pipe to the brake cylinder.

2. The combination with a straight air brake including a brake cylinder and a straight air pipe, of a car door engine and a valve device manually operable by a passenger in the car and having ports for controlling the fluid pressure on the door engine and the supply of fluid to the brake cylinder.

3. The combination with a straight air brake including a brake cylinder and a straight air pipe, of a fluid pressure operated device for controlling the power, a car door engine, and a valve device manually operable by a passenger in the car and having ports for controlling the fluid pressure on the door engine, the fluid pressure operated device, and the supply of fluid to the brake cylinder.

4. The combination with a straight air brake including a brake cylinder and a straight air pipe, of a fluid pressure operated power circuit breaker cylinder, a car door engine, and a cock manually operable by a passenger in the car and having a position in which fluid is supplied to the brake cylinder and to the circuit breaker cylinder and is released from the door engine.

5. The combination with a straight air brake equipment comprising a straight air brake valve, a straight air pipe, and a brake cylinder, of a safety car control equipment comprising a power circuit breaker cylinder, a car door engine, and a manually operable cock for controlling the fluid pressure on said circuit breaker cylinder and the door engine and the supply of fluid to the brake cylinder, and a double check valve for controlling communication from said cock and from the straight air pipe to the brake cylinder.

In testimony whereof I have hereunto set my hand.

EDWARD H. DEWSON.